United States Patent [19]

Pisculli et al.

[11] Patent Number: 5,021,974

[45] Date of Patent: Jun. 4, 1991

[54] METHOD FOR UPDATING A DISPLAY BITMAP WITH A CHARACTER STRING OR THE LIKE

[75] Inventors: Anthony C. Pisculli; Walter C. Moore, both of Seattle; Nathan P. Myrvold, Bellevue, all of Wash.

[73] Assignee: Microsoft Corporation, Redmond, Wash.

[21] Appl. No.: 244,222

[22] Filed: Sep. 13, 1988

[51] Int. Cl.⁵ .................. G06F 15/62; G09G 5/36
[52] U.S. Cl. ...................... 364/518; 364/521; 340/750; 340/799; 340/735
[58] Field of Search ............ 364/521, 523, 518; 340/750, 735, 747, 798, 799

[56] References Cited

U.S. PATENT DOCUMENTS

| | | | |
|---|---|---|---|
| 4,115,765 | 9/1978 | Hartke | 340/750 |
| 4,131,883 | 12/1978 | Lundstrom | 364/521 X |
| 4,308,532 | 12/1981 | Murphy | 340/723 |
| 4,555,763 | 11/1985 | Dahme | 340/750 |
| 4,594,587 | 6/1986 | Chandler et al. | 340/750 |
| 4,622,546 | 11/1986 | Sfarti et al. | 340/748 |
| 4,706,079 | 11/1987 | Kummer et al. | 340/799 |
| 4,864,518 | 9/1989 | Kurita | 364/521 |
| 4,910,505 | 3/1990 | Beaven et al. | 340/750 |
| 4,953,102 | 8/1990 | Kimura et al. | 364/518 |

Primary Examiner—Dale M. Shaw
Assistant Examiner—Raymond J. Bayerl
Attorney, Agent, or Firm—Seed and Berry

[57] ABSTRACT

An improved method and system for updating a display bitmap with a character string in a given font is provided. Each character in the font is stored as a character bitmap. Each character comprises a contiguous set of virtual characters. A visible stack is created for each character string to be displayed in the display bitmap. For each character to be displayed, the visible stack contains a pointer to each of its virtual characters. The data in the visible stack is then processed to update efficiently the display bitmap. The display bitmap is updated column by column, each column being one byte side. For each byte in the column, the virtual characters that are to be displayed in that byte are combined to form an output byte that is output to the display bitmap. The combining is accomplished by special-purpose routines based on the number of virtual characters that are to be displayed in a particular column.

15 Claims, 16 Drawing Sheets

Display Bitmap

CLIPPED_TABLE

| OPAQUE | White_on_black | Number of Virtual Characters |
|---|---|---|
| 0 | 0 | 1-8 |
| 0 | 1 | 1-8 |
| 1 | 0 | 1-8 |
| 1 | 1 | 1-8 |

FIG. 17

OPAQUE White_on_black

| | | |
|---|---|---|
| 0 | 0 | not al<br>or es:(di),al |
| 0 | 1 | or es:(di),al |
| 1 | 0 | not al<br>stosb |
| 1 | 1 | stosb |

METHOD FOR UPDATING A DISPLAY BITMAP WITH A CHARACTER STRING OR THE LIKE

TECHNICAL FIELD

This invention relates generally to a computer system for displaying information on a computer output device (e.g., display or printer) and more specifically a method and apparatus for updating a display bitmap.

BACKGROUND ART

The display of information on a computer output device typically occurs in either text or graphics modes. In text mode, information is displayed in a highly structured manner. The output device is logically divided into character cells. The output device displays one character in each character cell. The character cells are organized into a matrix of rows and columns. The output devices typically have a standard character set, which defines the text mode characters. The standard character set contains alphabetic characters, numeric characters, and special characters (e.g., $). Because of this structured approach, information can be displayed quickly. However, typically only the standard character set can be displayed.

In graphics mode, the output device is treated as a display bitmap (that is, a matrix of rows and columns of pixels). The output device turns on or off each pixel based on the information in the display bitmap. A computer program displays information by updating the display bitmap of the output device. The display bitmap is a storage array of 1's and 0's corresponding to the pixels to be turned on or off. To effect the display of information, the output device's processor reads the display bitmap and turns the corresponding pixels on or off on its display.

A common usage of computers, especially personal computers, has been word processing. Originally, the word processing programs displayed information in text mode using the standard character set. Competitive pressures have lead the developers of word processing software to provide increasingly sophisticated capabilities. Specifically, the word processing programs allow the documents to be printed in a wide variety of character fonts. Also, desktop publishing type features have been incorporated, such as varying character size, emboldening, and italics. The first word processing software with a multiple font capability would display the document on the screen in single font format. Only when the document was printed would the varied fonts be seen. Thus the user was unable to see what the document looked like until actually printed.

The developers then provided the capabilities to display the text on the screen in the same format as it would be printed. This feature has been referred to as What-You-See-Is-What-You-Get (WYSIWYG), that is, what the user sees on the screen is what gets printed. In order to implement WYSIWYG, the graphics mode of the output device is used.

Another common use of computers is for spreadsheet applications. A spreadsheet contains a grid of rectangular cells. Each cell can contain a character string. The spreadsheet program writes a character string to a cell by first blanking (opaquing) the cell and then writing the text to the blanked (opaqued) cell. This blanking and writing often results in a flashing effect. The user of the spreadsheet can perceive that a cell is first blanked then written to. The text is also clipped to the size of the cell. This clipping ensures that the text will not be written outside the cell.

Another common use of computers is to provide windowing environment for application programs. This windowing environment is common especially with personal computers. In multitasking, several computer programs can be executing concurrently. The programs may be sharing the same output device. The multitasking programs share the output device by writing to a window (a rectangular region) on the device. A multitasking executive ensures that an application does not write outside its assigned window. The executive enforces this policy by defining a clipping rectangle for each application program.

The conventional methods for displaying a character string within a rectangular region accomplishes the opaquing, clipping, and displaying functions by multiple updates to the display bitmap. The methods include the specifying of a clip region, then the opaquing of a rectangle by updating each byte of the rectangle within the display bitmap, and then displaying the character string by updating a portion of the rectangle within the display bitmap. The prior art methods are inefficient in their use of the computer resources, which leads to slow updating of display bitmaps and generally poor system performance.

DISCLOSURE OF THE INVENTION

It is an object of the present invention to provide a method and system for updating a display bitmap with a character string.

It is another object of the present invention to provide such a method and system that will minimize the number of writes to the display bitmap to effect the update.

It is another object of the present invention to provide such a system and method that can efficiently update a display bitmap when a clipping rectangle is specified.

It is another object of the present invention to provide such a system and method that can efficiently update a display bitmap when an opaquing rectangle is specified.

These and other objects, which will become apparent as the invention is more fully described below, are obtained by an improved method and system for updating a display bitmap. In a preferred embodiment, a character bitmap is comprised of a contiguous set of virtual characters and the width of each character. A visible stack is created for each character string to be displayed, with offset, width and phase for each virtual character in the string. The data in the visible stack is then processed to efficiently update the display bitmap.

BRIEF DESCRIPTION OF THE DRAWINGS

FIG. 7-1 illustrates a sample character cell for the letter "M".

FIG. 7-2 illustrates the storage of the virtual characters that comprise the letter "M".

FIG. 11-1 illustrates text that is not bounded in the y direction by the opaque rectangle.

FIG. 11-2 illustrates the setting of amount_clipped_on_top and clipped_font_height.

FIG. 11-3 illustrates text that is outside the clip rectangle and thus not visible.

FIG. 11-4 illustrates the text bounding box and the setting of CLIPPED_RIGHT.

FIG. 11-5 illustrates the text bounding box and the setting of CLIPPED_LEFT.

FIG. 13-1 illustrates the visible_stack.

FIG. 13-2 illustrates the phase of a virtual character.

FIG. 13-3 illustrates the setting of the left_clip_mask.

FIG. 15-1 illustrates left padding in transparent mode.

FIG. 15-2 illustrates left padding in opaque mode.

FIG. 15-3 illustrates no left padding in an opaque mode.

FIG. 17 illustrates the assembly language code that is used to update the display bitmap.

DETAILED DESCRIPTION OF THE INVENTION

A preferred embodiment of the present invention is described below as implemented on an IBM PC or compatible computer. The system, referred to below as EXTTEXTOUT, updates a specified display bitmap to display characters in a specified font.

Figure 1:
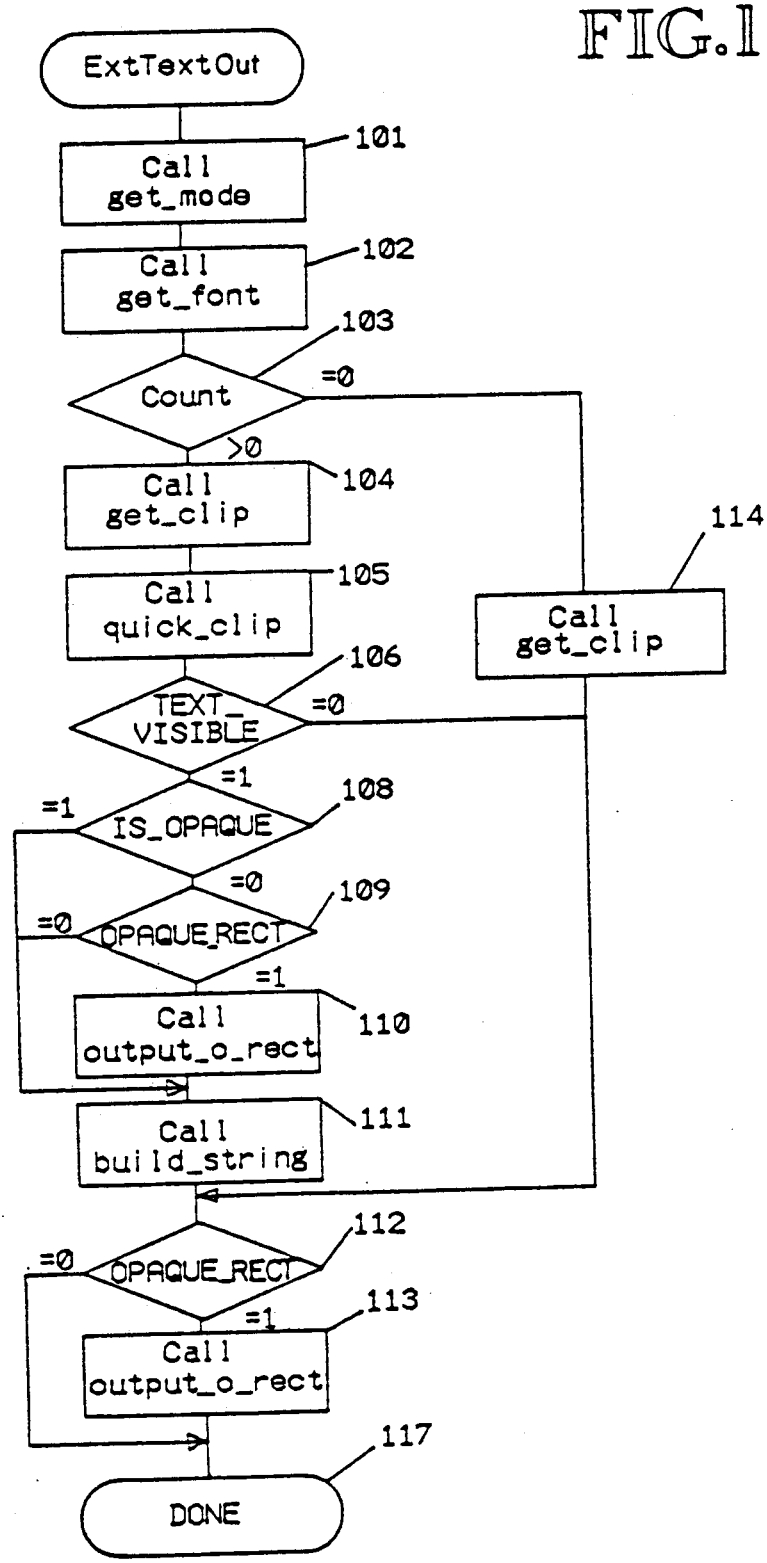
FIG. 1 is a logical flow chart of the exttextout system.
Figure 2:
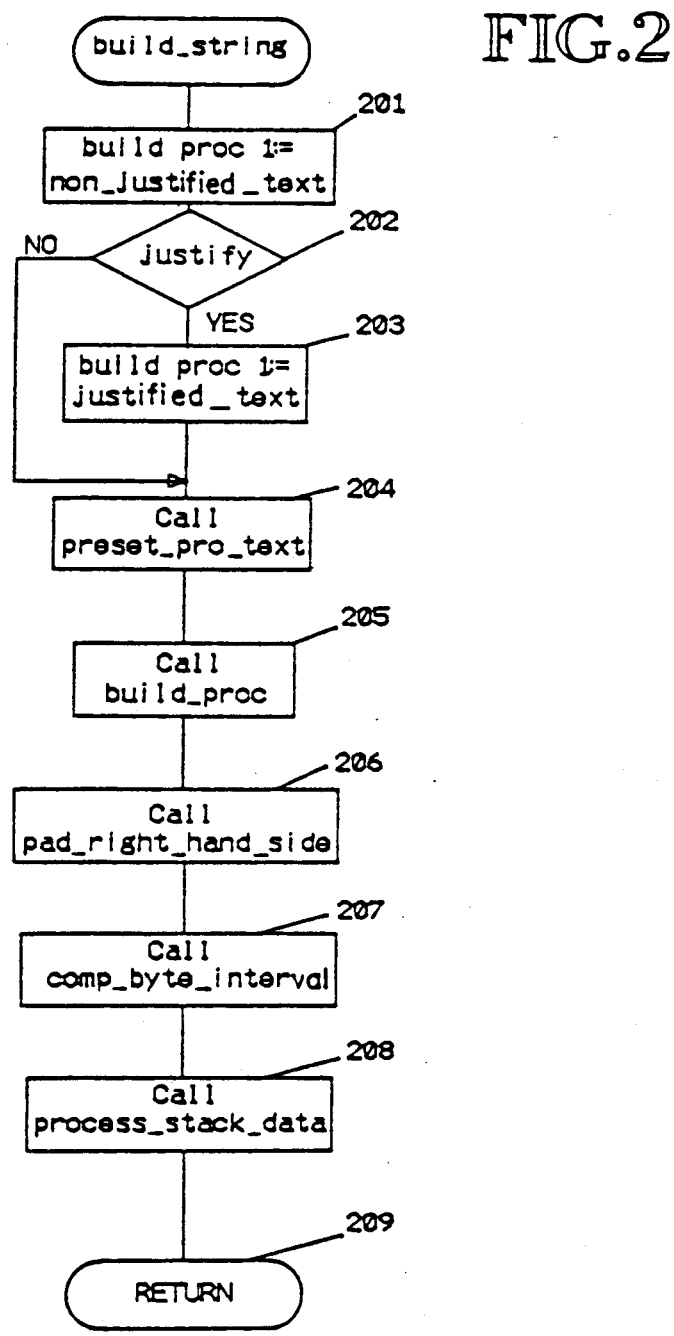
FIG. 2 is a logical flow chart of the build_string subroutine.
Figures 1, 7:
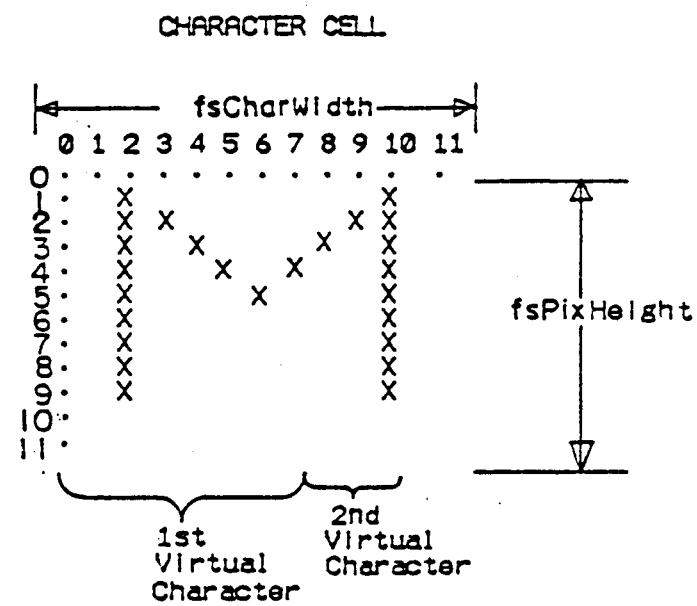
Figures 2, 7:
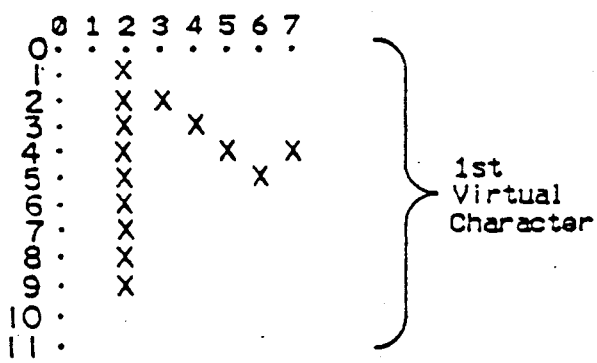
Figures 3, 7:
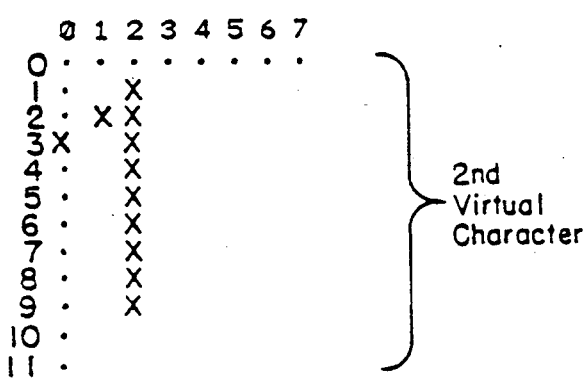

The system processes the definitions for each character in the specified string. The character definitions are stored in a character bitmap format. The character bitmap format defines a set of virtual characters for each character. As illustrated in FIGS. 7-1 and 7-2 for the character "M". Each virtual character is stored as a set of contiguous bytes.

The system creates a visible stack of the virtual characters that are to be displayed. The visible stack contains the phase, width, and pointer to the definition of the virtual characters. The format of the visible stack is well-suited to the efficient update of the display bitmap. The visible stack may contain entries for a null virtual character to provide for intercharacter spacing when the string is right justified.

For each one-byte column in the area to be updated, the system determines the number of virtual characters, based on the information in the visible stack, that will be displayed in that column. The system then updates all the bytes in that area of the bitmap, column by column. The system updates the column by retrieving for each scan line in the column the corresponding bytes from the virtual character definition for each virtual character to be displayed in the column. The system combines these bytes of virtual character definitions and updates the display bitmap.

The system also provides a clipping function so that the character string will not be displayed outside a specified clipping rectangle. The system provides an option for opaquing a rectangle.

To facilitate the description of the invention, the following section provides the definitions some of terms and description of input parameters.

WORKING DEFINITIONS

The following is list of definitions. These definitions are provided a basis for the description of the system.

Bitmap: an array of bits that defines an display image; each bit corresponds to one pixel on the output device.

Font: a group of characters. Each character of a font is generally of a similar style, e.g., pica. Each character in the font is stored as a character bitmap.

Figure 8:
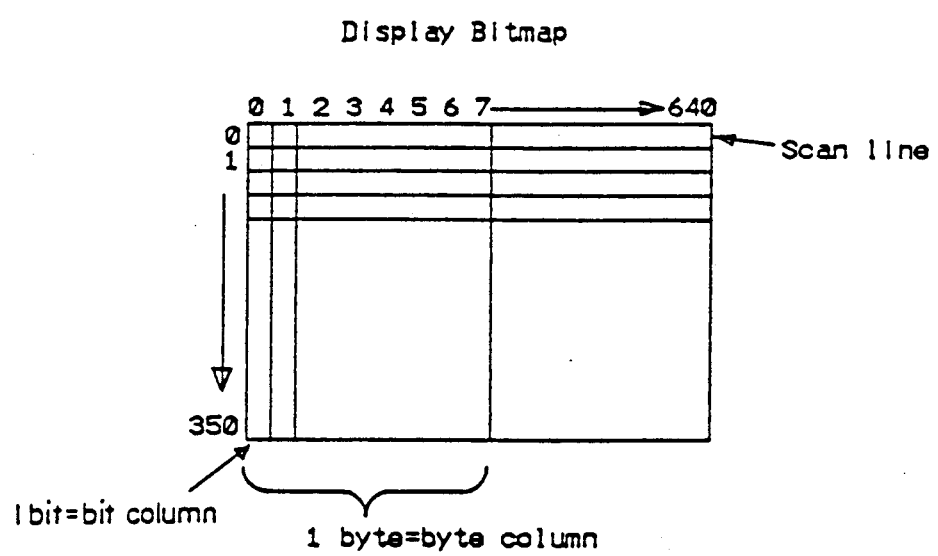
FIG. 8 illustrates a display bitmap.

Display Bitmap: a matrix of rows and columns of pixels (FIG. 8); the display bitmap is typically read by the output device to update the screen to correspond to the information contained in the display bitmap. The pixels are grouped into units of addressability of the computer memory. The typical unit of addressability is the 8-bit byte. Each vertical column of bytes is called a byte column.

Scan line: a row in the display bitmap.

Character: a particular symbol; a character can be alphabetic, numeric, or special (e.g., A,1,$).

Character Cell: a matrix of pixels that define a character. FIG. 7-1 illustrates a character cell that define the character "M". As illustrated the character is 12 pixels high and 12 pixels wide.

Character Bitmap: a bitmap that contains a character definition of character cell. The character is stored a contiguous set of virtual characters. If the last virtual character is not eight bits wide then the left over pixels are set to 0 to fill the byte. In FIG. 7-2, the character bitmap for "M" is illustrated.

Figure 9:
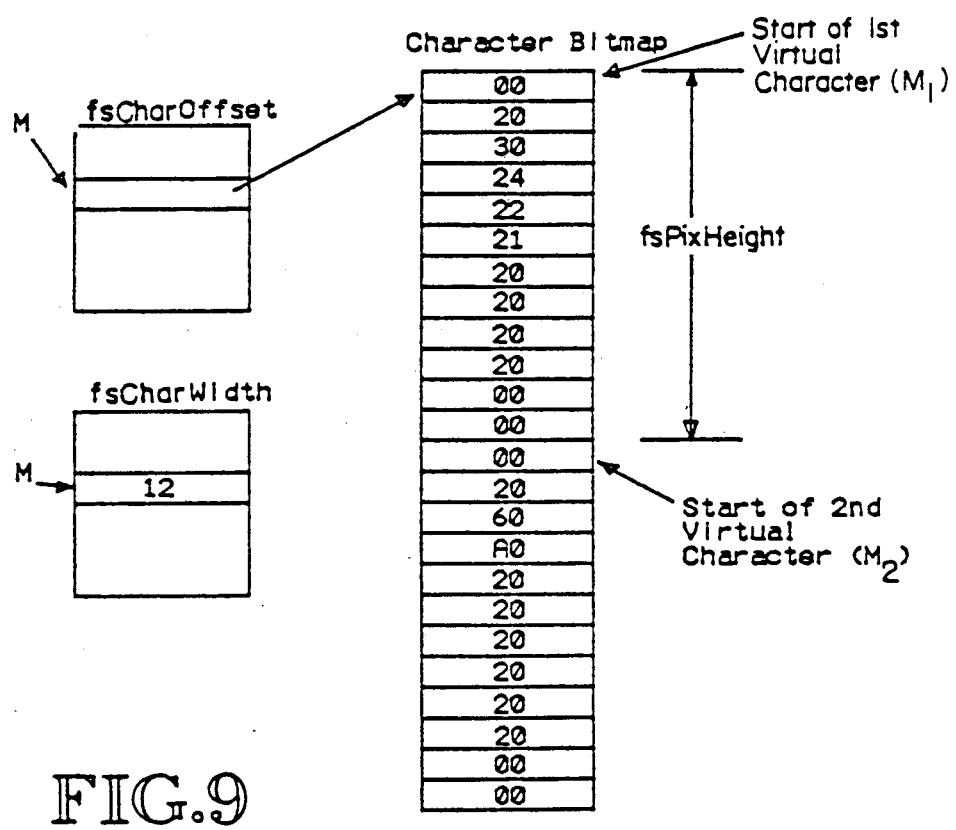
FIG. 9 illustrates the layout of the character bitmaps for the letter "M".

Virtual Character: each character in a font comprises one or more virtual characters. Each virtual character is one byte wide, except possibly for the last virtual character. In FIG. 9, the character "M" comprises two virtual characters. The width of the second virtual character is 4 pixels. The left-over bits are stored as 0's.

Display Mode: specifies the manner in which the characters are to be displayed. In opaque mode, the 0 and 1 bits of the characters overwrite the prior contents of each bit. In transparent mode, if white-on-black is selected then the new contents of each bit is set to the logical-OR of the prior contents of each bit in the display bitmap and the corresponding bit in the character bitmap, else the new contents of each bit is set to the logical-AND of the prior contents of each bit in the display bitmap and logical-NOT of the corresponding bit in the character bitmap.

White-on-black: for a monochrome display, means that the foreground is white and the background is black.

Null Character: a character whose character bitmap contains all 0's. The system uses the null character for intercharacter spacing when justifying text and padding the text so that output to the display bitmap is display byte aligned.

INPUT DATA

The invention employs the follow data as input parameters:

lp_string: a string of the characters to be output to the display bitmap.

x: the starting x_coordinate in the display bitmap at which to output lp_string.

y: the starting y_coordinate in the display bitmap at which to output lp_string.

lp_clip_rect: data structure that contains the left, right, top, and bottom coordinates of the clip rectangle. The top and left coordinates are inclusive, that is, pixels at the coordinate are displayed. The bottom and right coordinates are exclusive, that is, pixels at that coordinate are not displayed. The structure contains the following values:

lp_clip_rect.left
lp_clip_rect.right
lp_clip_rect.bottom
lp_clip_rect.top lp_opaque_rect: data structure that contains the left, right, top, and bottom coordinates of the opaque rectangle. The top and left coordinates are inclusive. The bottom and right coordinates are exclusive. The structure contains the following values:

lp_opaque_rect.left
lp_opaque_rect.right
lp_opaque_rect.bottom
lp_opaque_rect.top count: the number of characters in lp_string.

lp_dx: an array of values containing the width (number of pixels) of each character in lp_string. This width will override the width in fsCharWidth.

ETO_OPAQUE_FILL: a flag that indicates whether lp_opaque_rect is to be filled in.

ETO_OPAQUE_CLIP: a flag that indicates whether lp_opaque_rect is to be clipped to lp_clip_rect.

lp_font: data structure that contains the font definition, the structure contains the following values:

fsPixWidth
fsPixHeight
fsMaxWidth
fsLastChar
fsFirstChar
fsDefaultChar
fsBreakChar
fscharoffset
fsCharWidth
fsNullOffset fsPixWidth: the width of each character in the font, if PixWidth is 0 then the font has variable width characters whose widths are specified by the fsCharWidth array.

fsPixHeight: the height of the character bitmaps.

fsMaxWidth: the maximum pixel width of any character in the font.

fsLastChar: the first character code defined by this font.

fsFirstChar: the last character code defined by this font.

fsDefaultChar: the character to substitute whenever a character is out of the fsFirstChar and fsLastChar range.

fsBreakChar: the character which will define word breaks, null pixels may be added to break characters for justification.

fscharoffset: an array that contains the pointer to the character bitmap of each character in the font (FIG. 9).

fsCharWidth: an array that contains the width of each character in the font (FIG. 9).

fsNullOffset: a pointer to the null character.

lp_draw: data structure that contains drawing information; the structure contains the following values:
TBreakExtra
BreakExtra
CharExtra
bkMode
WHITE_ON_BLACK TBreakExtra: total number of null pixels to be added to the break characters in lp_string.

BreakExtra: number of null pixels to be added to the each break character, in addition to CharExtra.

CharExtra: number of null pixels to be added to each character in lp_string for justification.

bkMode: flag that indicates whether the mode is opaque or transparent.

WHITE_ON_BLACK: flag that indicates whether the text is to be written white_on_black.

BitmapOffset: pointer to the first byte of the display bitmap.

bmByteWidth: width of the bitmap in bytes.

EXTTEXTOUT

This system, called extended text out, outputs a character string (lp_string), within a rectangular clipping region (lp_clip_rect) on a specified display bitmap (BitmapOffset), using the input font (lp_font) at a specified x (x) and y (y) coordinates. The clipping region is the only region in the bitmap to which the character string may be sent. The system optionally fills in an opaque rectangle (lp_opaque_rect) as indicated by ETO_OPAQUE_FILL and clips the opaque rectangle as indicated by ETO_OPAQUE_CLIP. The characters are spaced according to a width vector (lp_dx), extra pixels (lp_draw), and font characteristics (lp_font).

In block 101 of FIG. 1, the system calls get_mode (described below). In block 102, the system calls get_font. In block 103, if count equals 0 then no text is to be output and only the opaque rectangle is to be output and the system proceeds to block 114, else the system proceeds to block 104.

In block 104, the system calls get_clip. In block 105, the system calls quick_clip and sets cell_adjust equal to bmByteWidth times clipped_font_height and minus one. In block 106, if TEXT_VISIBLE equals 0 then the text is completely clipped and the system proceeds to block 112, else the system proceeds to block 108.

In block 108, if IS_OPAQUE is 1 then the selected mode is opaque and the system proceeds to block 111, else the system proceeds to block 109.

In block 109, if OPAQUE_RECT equals 0 then no opaque rectangle is specified and the system proceeds to block 111; else the selected mode is transparent, an opaque rectangle is specified, and the system sets OPAQUE_RECT to 0 and proceeds to block 110.

In block 110, the system calls output_o_rect because the selected mode is transparent and an opaque rectangle is specified. Since the mode is transparent, the system will fill the opaque rectangle before any text is written so that the text will be written in transparent mode over the opaque rectangle.

In block 111, the system calls build_string and proceeds to block 112.

In block 112, if OPAQUE_RECT is 1 then an opaque rectangle is present and not yet output and the system proceeds to block 113, else the system proceeds to block 117.

In block 113, the system calls output_o_rect to opaque the area outside the text bounding box that is inside the opaque rectangle because the selected mode is opaque.

In block 114, the system calls get_clip and proceeds to block 112.

In block 117, the system completes exttextout.

Source code for a representative routine accomplishing this function is filed herewith in Table I.

GET_MODE

This subroutine initializes local variables and flags based on the data in lp_draw. The following are initialized:

HAVE_WIDTH_VECT set to 1 if lp_dx is present.
HAVE_BRK_EXTRA set to 1 if BreakExtra is not equal to 0.
HAVE_CHAR_EXTRA set to 1 if CharExtra is not equal to 0.
IS_OPAQUE set to 1 if bmMode indicates opaque mode.
char_extra set to CharExtra.
brk_extra set to BreakExtra.
tot_brk_extra set to TBreakExtra.

Source code for a representative routine accomplishing this function is filed herewith in Table I.

GET_FONT

This subroutine initializes local variables and flags based on the data in lp_font. The following are initialized:

FIXED_PITCH if fsPixWidth is not equal to 0 then set to 1.
font_width set to fsPixWidth.
font_height set to fsPixHeight.
max_width set to fsMaxWidth.
last_char set to fsLastChar.
first_char set to fsFirstChar.
default_char set to fsDefaultChar.
break_char set to fsBreakChar.
null_char_offset set to fsNullOffset.

Source code for a representative routine accomplishing this function is filed herewith in Table I.

GET_CLIP

Figure 10:
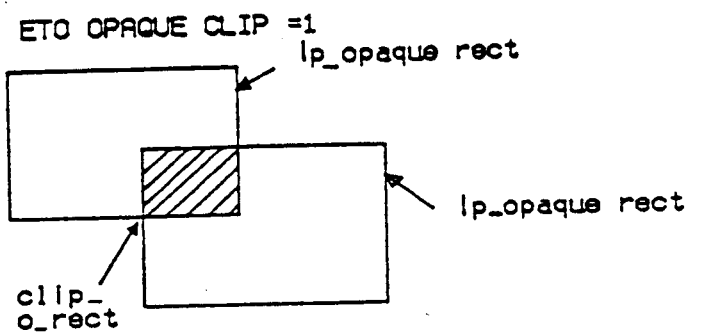
FIG. 10 illustrates the effect of setting the ETO_OPAQUE_CLIP flag.
Figure 10:
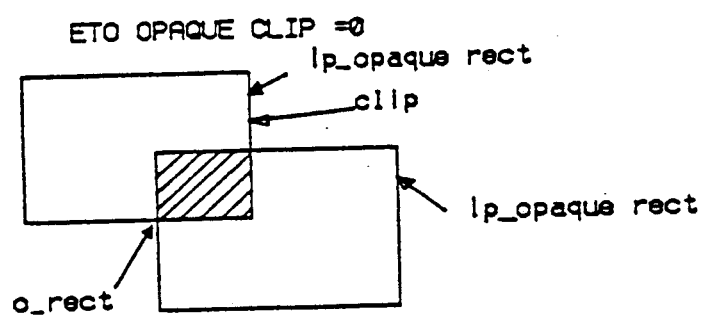

This subroutine initializes the o_rect and the clip data structures. The system initializes OPAQUE_RECT to 0, which indicates whether that opaque rectangle is not present. If ETO_OPAQUE_CLIP and ETO_OPAQUE_FILL equal 0 then the system sets clip to lp_clip_rect and returns from get_clip. If ETO_OPAQUE_CLIP equals 1 then the system sets o_rect and clip to the intersection of lp_clip_rect and lp_opaque_rect; else the system sets clip to lp_clip_rect and sets o_rect to the intersection of lp_clip_rect and lp_opaque_rect. The opaque rectangle may be a null rectangle because either none was specified or it is entirely clipped by the clip rectangle. If the opaque rectangle is not null and ETO_OPAQUE_FILL equals 1 then the system sets OPAQUE_RECT to 1. The system then returns from get_clip. FIG. 10 illustrates the setting of the clip and o_rect rectangles.

Source code for a representative routine accomplishing this function is filed herewith in Table I.

QUICK_CLIP

This subroutine determines whether the text is completely clipped, partially clipped, possibly clipped, or completely visible. The text is partially clipped if x is less than clip.left, if y is less than clip.top, or if y plus font_height is greater than clip.bottom. The text is possibly clipped if x plus the maximum extent of the text is greater than clip.right. The maximum extent of the text is calculated by the following formula:

$$count*(max\_width+char\_extra)+tot\_brk\_extra.$$

If HAVE_WIDTH_VECT equals 1 then the system sets the maximum extent to the maximum positive integer to indicate that lp_dx may indicate very large width.

Figure 4:
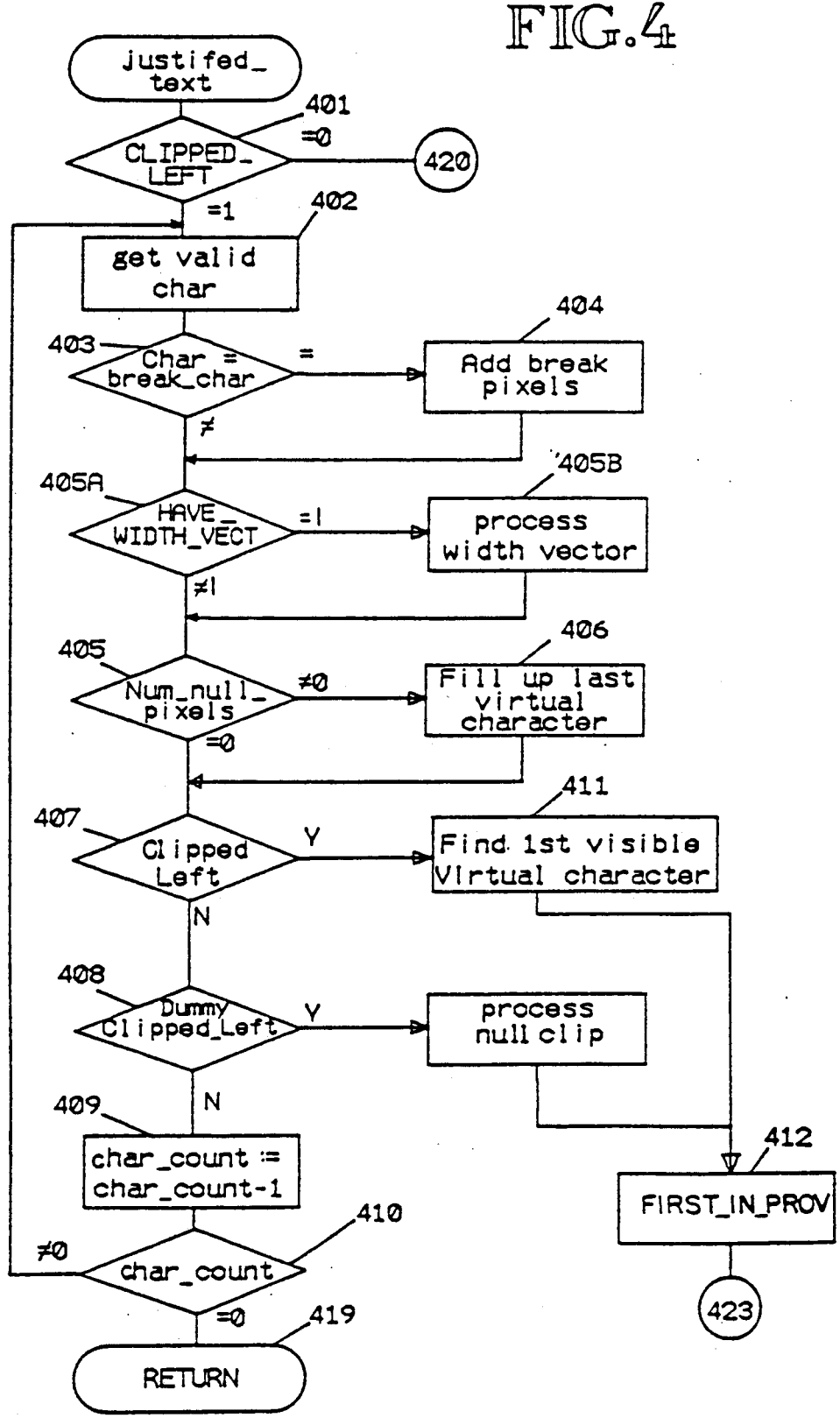
FIG. 4 is a logical flow chart of the justified_text subroutine.
Figure 5:
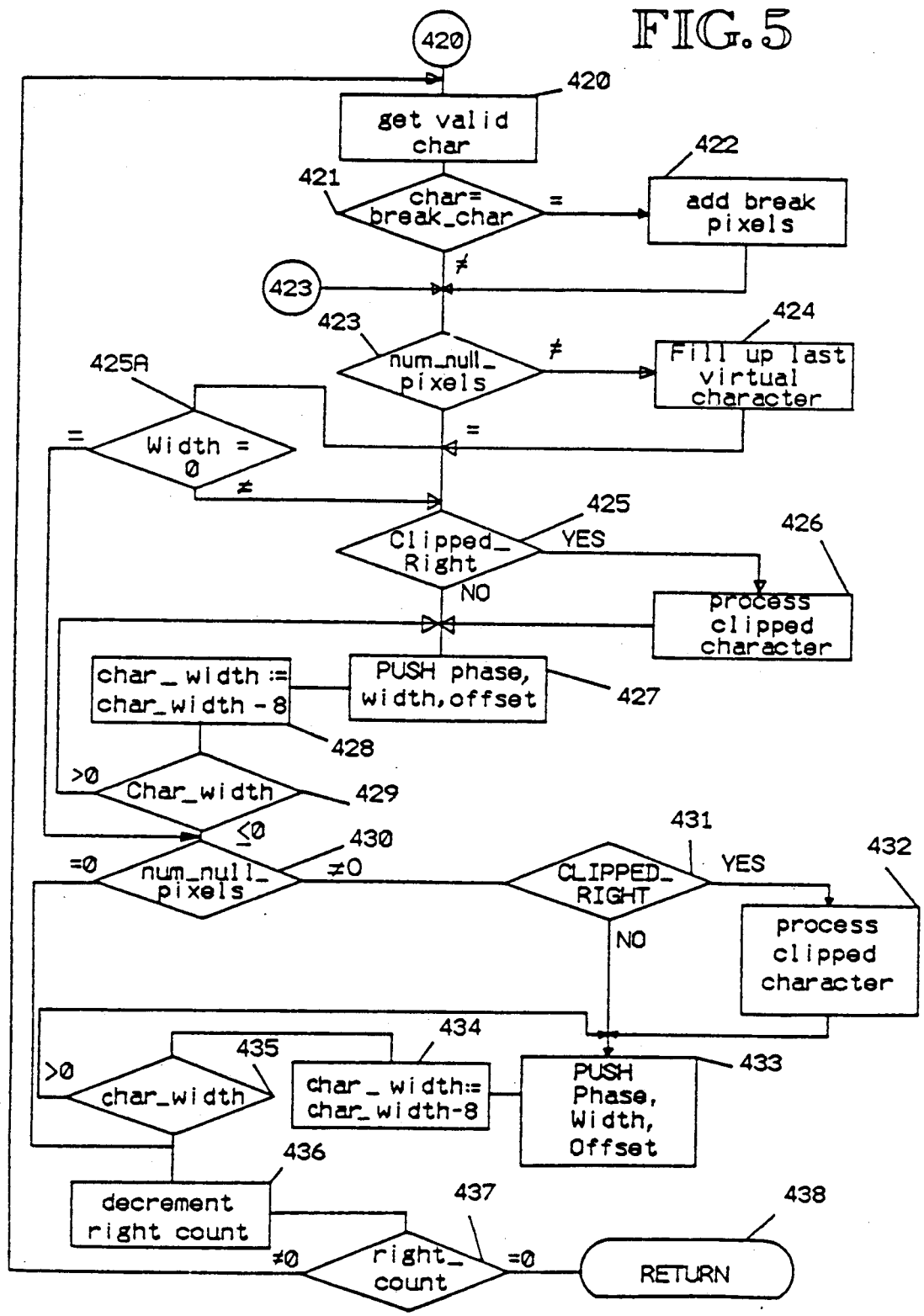
FIG. 5 is a continuation of the logical flow chart of the justified_text subroutine.
Figures 1, 11:
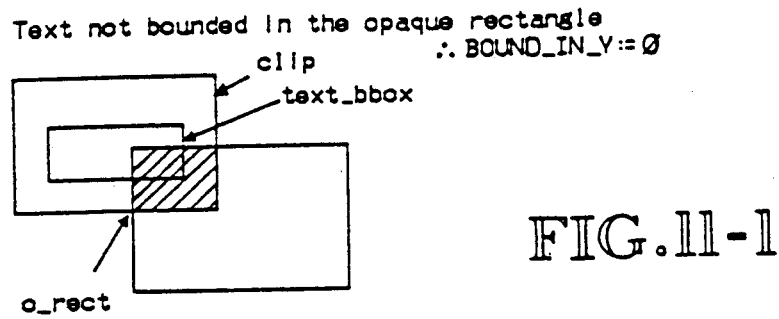
Figures 2, 11:
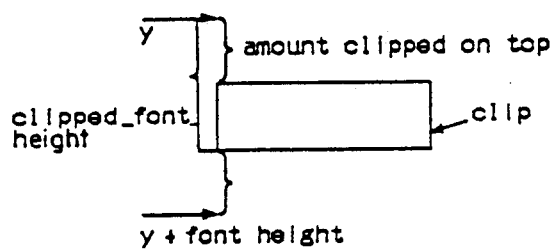
Figures 3, 11:
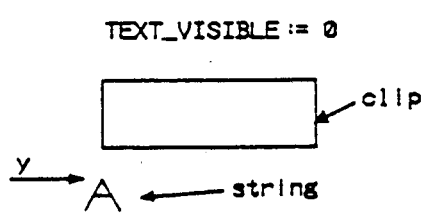
Figures 4, 11:
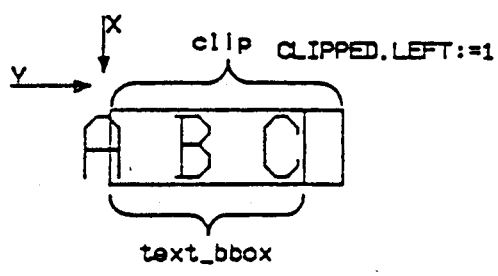
Figures 5, 11:
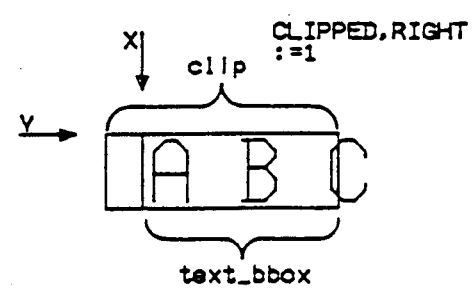

If lp_string is clipped to the left or right then CLIPPED_LEFT or CLIPPED_RIGHT are set to 1. FIGS. 11-4 and 11-5 illustrate the setting of the flags and the setting of the text bounding box (text b box). The text bounding is a rectangle which bounds the text within the clip rectangle. The right coordinate of the bounding box is set to the maximum extent. The system will adjusted the text bounding box to accommodate left or right padding and the actual extent. Left and right padding are discussed below.

Figure 3:
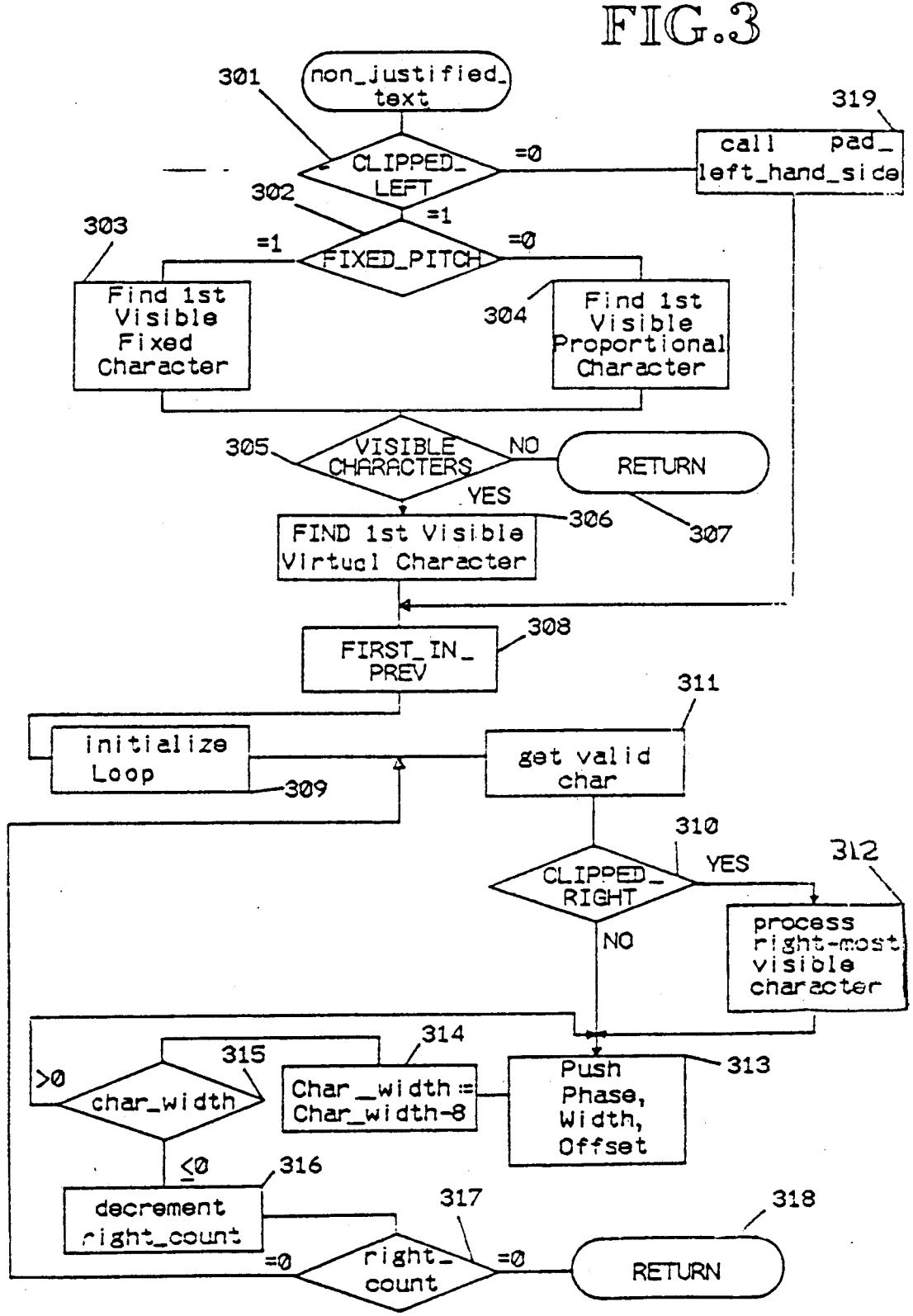
FIG. 3 is a logical flow chart of the non_justified_text subroutine.

FIG. 11-3 illustrates the situation when no text falls within the clip rectangle. If no text visible then the system sets TEXT_VISIBLE to 0; else to 1. If the text falls entirely within the y-coordinates of o_rect then the system sets BOUNDED_IN_Y to 1; else to 0. FIG. 11-1 illustrates the bounding.

FIG. 11-2 illustrates the setting of clipped_font_height and amount_clipped_on_top. The system uses the clipped_font_height to indicate the height of the byte column to update. The system uses the amount_clipped_on_top to add to the fscharoffset to obtain the first byte of the virtual character bitmap to output.

Source code for a representative routine accomplishing this function is filed herewith in Table I.

OUTPUT_O_RECT

Figures 12, 14:
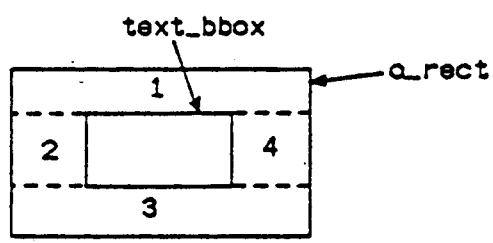
FIG. 12 illustrates the sub-rectangles that are opaqued.
FIG. 14 illustrates dispatch table for the clipped bytes.

This subroutine fills the opaque rectangle (o_rect). If there is no text or if the text bounding box does not intersect the opaque rectangle then the system fills in the opaque rectangle (o_rect). If the text bounding box and the opaque rectangle do intersect then the system fills in the area of the opaque rectangle outside the text bounding box. FIG. 12 illustrates four sub-rectangles that this subroutine may opaque.

Source code for a representative routine accomplishing this function is filed herewith in Table I.

BUILD_STRING

In the preferred embodiment, the system contains a subroutine for processing non-justified text and a subroutine for processing justified text. These subroutines create the visible_stack. The visible_stack contains an entry for each the virtual character that is to be output. Each entry contains the phase, width, and offset of a virtual character to be displayed.

Figures 1, 13:
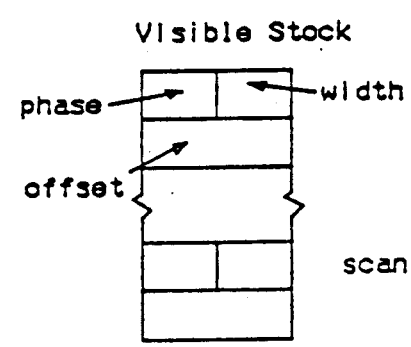
Figures 2, 13:
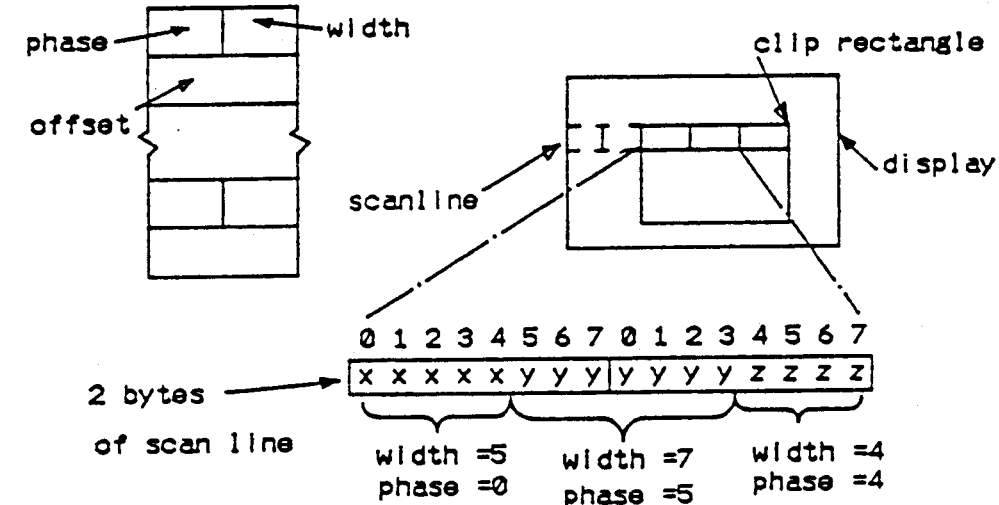
Figures 3, 13:
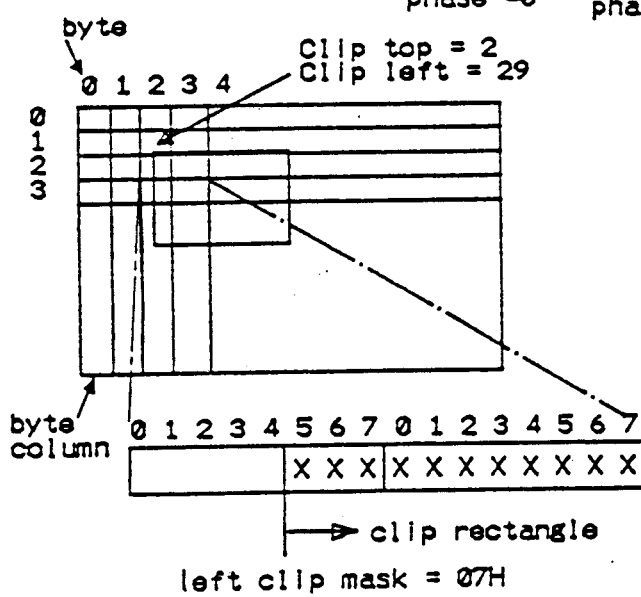

The phase represents the bit number within a display byte into which the left-most bit of the virtual character is to be written. FIG. 13-2 illustrates the phase and width values for 3 virtual characters (indicated by X, Y, and Z). Since X starts at the first bit in a display byte its phase is 0, whereas Y starts at the sixth bit of a display byte, so its phase is 5. The offset of the virtual character is a pointer to the virtual character bitmap (from fscharoffset).

The text bounding box may not start or end on a display byte boundary. For example, a clip rectangle that is specified may not be on a display byte boundary as illustrated in FIG. 13-3. In this example, the left coordinate of the clip rectangle is 21, which means that this system will not update any pixels to the left of pixel 21. Since 21 is not a multiple of eight, the clip rectangle does not start on a display byte boundary. The system generates left_clip_mask to use when the left-most byte is output. The system similarly generates a right_clip_mask when the right coordinate of the text bounding box is not a multiple of eight. Also the system sets inner_byte_count to the number of display bytes in a scan line that are to be updated excluding the left-most and right-most bytes if they are clipped.

The system calls process_stack_data to update the display bitmap. This subroutine updates the area within the clip rectangle by starting from the left-most display byte and writing the entire byte column and then proceeding the next column to the right until the right-most byte column is updated.

In blocks 201 through 203 of FIG. 2, the system determines whether to call non_justified_text or justified_text subroutine. In block 201, the system initializes build_proc to point to the non_justified_text subroutine. In block 202, if no justification is involved (i.e., if HAVE_CHAR_EXTRA, HAVE_BRK_EXTRA, or HAVE_WIDTH_VECT are each equal to 0) then the system proceeds to block 204, else the system proceeds to block 203. In block 203, the system sets build_proc to point to the justified_text subroutine.

In block 204, the system calls preset_pro_text. In block 205, the system calls the subroutine pointed to by build_proc. In block 206, the system calls pad_right_hand_side. In block 207, the system calls comp_byte_interval. In block 208, the system calls process_stack_data and returns from build_string.

Source code for a representative routine accomplishing this function is filed herewith in Table II.

PRESET_PRO_TEXT

In the preferred embodiment, this subroutine determines the offset into the dispatch table based on the value of IS_OPAQUE and WHITE_ON_BLACK. The dispatch table is a list of pointers to subroutines for outputting a byte column to the display bitmap. The dispatch table contains the address of 32 subroutines. There are eight subroutines for each combination of IS_OPAQUE and WHITE_ON_BLACK FIG. 14 illustrates the truth table. Each of the eight subroutines within each combination outputs from 1 to 8 eight virtual characters. A byte column can have 1 to 8 virtual characters output to it. Each of these eight routines can be optimized to output a display byte column that contains a specific number of virtual characters.

In the preferred embodiment, there are two sets of dispatch tables: non_clipped_table for outputting byte columns that are not clipped and clipped_table for outputting byte columns that are clipped. The system sets dispatch_index based on IS_OPAQUE and WHITE_ON_BLACK as an index into the dispatch tables.

Source code for a representative routine accomplishing this function is filed herewith in Table III.

PAD_RIGHT_HAND_SIDE

This subroutine attempt to pad out the visible_stack to a display byte boundary. The system pads by pushing a null virtual character and its width onto the visible_stack. The system pads to a byte boundary and adjusting the text bounding box approximately.

Source code for a representative routine accomplishing this function is filed herewith in Table II.

NON_JUSTIFIED_TEXT

This subroutine creates the visible_stack for a character string that contains no justification parameters. The system uses the width from the fsCharWidth or font_width as the character width.

In block 301 of FIG. 3, if CLIPPED_LEFT equals 1 then the system proceeds to block 302, else the system selects the left-most character and virtual character in lp_string and proceeds to block 319.

In block 302, if FIXED_PITCH equals 1 then the system proceeds to block 303, else the system proceeds to block 304. In the preferred embodiment, the system determines the first visible character for proportional and fixed width fonts by invoking different routines. Since each character of the fixed font is the same width, the first visible character can be determined without using the character width stored in fsCharWidth.

In block 303, the system determines the first character that is visible (i.e., to the right of clip.left) for the specified font, which is a fixed font. Since the width of each character is fixed, the first visible character is determined by summing the font_width for each character in the lp_string until the character whose x_origin plus font_width is greater than clip.left. The x_origin of a character or virtual character is the starting x-coordinate of the character, that is, where it is to be displayed. The system selects that character and proceeds to block 305.

In block 306, the system determines the first character that is visible (i.e., to the right of clip.left) for the specified font, which is a proportional font. Since the width of the character is proportional, the system determines the first visible character by successively retrieving the characters in lp_string until a character whose x_origin plus its width from fsCharWidth is greater than clip.left is retrieved. The system selects that character and proceeds to block 305.

In block 305, the system determines if any visible characters were located. No characters are visible if the x_origin of the right-most character in lp_string plus its width (from fonts_width or fsCharWidth) is less than or equal clip.left. If no characters are visible then the system proceeds to block 307 and the system returns from the non_justified_text subroutine, else the system proceeds to block 306.

In block 306, the system determines the first visible virtual character of the selected character. The x_origin of the selected character may not be equal to clip.left. The system selects the virtual character that contains the pixel whose x-coordinate is equal to clip.left.

In block 308, if the x_origin of the selected virtual character is not in the same display bitmap byte as clip.left then the system sets FIRST_IN_PREV to 1, else the system sets FIRST_IN_PREV to 0.

In block 309, the system initializes the loop for pushing the visible virtual characters onto the visible_stack. The system starts the loop by processing at the selected character, which is the left-most visible character. The virtual characters that are pushed onto the stack are the selected virtual character and those virtual characters to its right whose x_origin is less than clip.right. The system sets right_count to the number of characters in lp_string to the right of and including the selected character.

In block 310, the system selects the next valid character from lp_string. A valid character must be in the range of first_char and last_char, otherwise the system selects the default_char. The system sets char_width equal to the width of the selected character (fsCharWidth).

In block 311, the system determines if the selected character is clipped to the right. The selected character is clipped to the right if its x_origin plus char_width is greater than clip.right. If the selected character is clipped to the right then the system proceeds at block 312, else the system proceeds at block 313.

In block 312, the system processes the right-most visible character, sets right_count to 1 (which causes the test at block 317 to branch to block 318), sets char_width to clip.right minus x_origin of the selected character, and proceeds to block 313.

In block 313, the system selects the next virtual character of the selected character. The system pushes onto the visible_stack the phase, width, and offset of the selected virtual character. In block 314, the system decreases char_width by 8. In block 315, if char_width is less than or equal to zero then all the virtual characters for the selected character have been processed and the system proceeds to block 316, else the system loops to block 313 to push the next virtual character.

In block 316, the system decrements right_count. In block 317, if right_count equals 0 then all the visible characters have been processed and their visible virtual characters have been pushed onto the visible_stack, and the system returns from the non_justified_text subroutine, else the system loops to block 310 to process the next visible character.

Source code for a representative routine accomplishing this function is filed herewith in Table II.

PAD_LEFT_HAND_SIDE

Figures 1, 15:
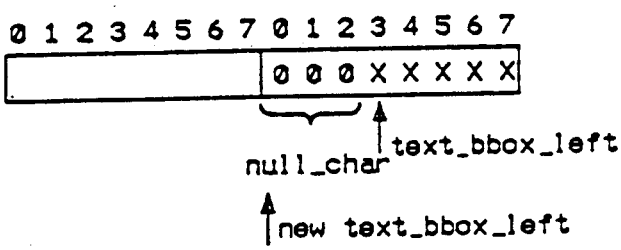
Figures 2, 15:
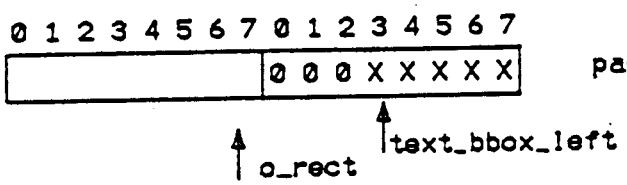
Figures 3, 15:
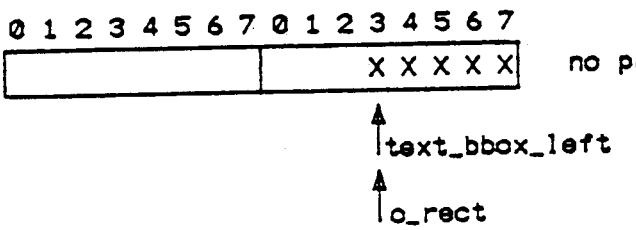

This subroutine attempts to pad the left-most character so that it will be aligned on a display byte boundary. The system pads by pushing the offset, a width and a phase of a null virtual character onto the visible_stack. FIG. 15-1 illustrates that a null virtual character with a width of 3 is needed to pad. When the transparent mode is selected then the system can always pad to the left. If, however, the mode is opaque then the system only pads to the left when OPAQUE_RECT equals 1, BOUNDED_IN_Y equals 1, and o_rect.left is less than the byte boundary as illustrated in FIGS. 15-2 and 15-3.

Source code for a representative routine accomplishing this function is filed herewith in Table II.

JUSTIFIED_TEXT

This subroutine creates the visible_stack for a character string that contains justification parameters. The system uses the width from fsCharWidth, lp_dx, and the justification parameters to calculate the character width as displayed.

In block 401 of FIG. 4, the system initializes FIRST_IN_PREV to 0. If CLIPPED_LEFT equals 1 then the system sets right_count and char_count to count and proceeds to block 402, else the system proceeds to block 420.

In block 402, the system retrieves and selects the next valid character in lp_string. The system sets char_width to the width of the selected character from fsCharWidth. The system determines the number of null pixels that is to be added after the selected characters. The system sets num_null_pixels to char_extra, which contains the number of null pixels to be added to each character for justification. The system may add additional pixels to selected characters that are the break character. In block 403, if the selected character equals break_char then the system proceeds to block 404, else the system proceeds to block 405A. In block 404, if HAVE_BRK_EXTRA equal 0 then the system adds no additional pixels to the break character, else the system adds brk_extra to num_null_pixels. The system proceeds to block 405A.

In block 405A, if HAVE_WIDTH_VECT equals 1 then the system proceeds to block 405B, else the system proceeds to block 405. In block 405B, if the width from lp_dx for the selected character is greater than char_width plus num_null_pixels then the system sets num_null_pixels to the width from lp_dx minus char_width and proceeds to block 405.

In block 405, if num_null_pixels equals 0 then no null pixels are to be added to the selected character and the system proceeds to block 407, else the system proceeds to block 406. In block 406, if char_width is not a multiple of 8, then there is room in the last virtual character to add some null pixels. The system increases char_width by the lesser of num_null_pixels and the number of null pixels that will fit into the last virtual character. The system decreases num_null_pixels by the same amount. The system proceeds to block 407.

In block 407, if the selected character is clipped to the left (i.e., x_origin+char_width>clip.left) then the system proceeds to block 411, else the system proceeds to block 408.

In block 411, the system determines the first visible virtual character. The x_origin of the selected character may not be equal to clip.left. The system selects the virtual character that contains the pixel whose x-coordinate is equal to clip.left. The selected virtual character is the first visible virtual character. The system proceeds to block 412.

In block 412, if the x_origin of the selected virtual character is not in the same display bitmap byte as clip.left then the system sets FIRST_IN_PREV to 1, else the system sets FIRST_IN_PREV to 0. The system sets right_count to the number of characters to the right of and including the selected character. The system proceeds to block 423. The system is initialized to enter the block 420 through block 437 loop. Since the num_null_pixel has already been calculated, the proceeding to block 423 is appropriate.

In block 408, if the selected character is clipped to the left because some of the null pixels have not been included in char_width then the system proceeds to block 413, else the system proceeds to block 409. In block 409, the system decrements char_count. In block 410, if char_count equals 0 then all the characters are clipped to the left and the system return from the justified_text subroutine, else the system loops to block 402.

In block 413, the system selects the null character, selects the null virtual character, and sets char_width to zero and proceeds to block 412.

In blocks 420 through 424, the system processes in a manner that is similar as described above in block 402 through 406 to select the next character and determine the number of null pixels.

In block 425A, if char_width equals 0 then the system proceeds to block 430, else the system proceeds to block 425.

In block 425 through 429, the system processes the data in a similar manner as described in block 311 through 315. However, the system also sets num_null_pixels to 0 in block 426.

In block 430, if num_null_pixel equals 0 then the system proceeds to block 436, else a null character is needed to accommodate the null pixels and the system sets the x_origin for a null character to the x_origin of the selected character plus its width as was determined in block 424, selects the null character, sets char_width equal to num_null_pixels, and selects the first virtual character and proceeds to block 431. In block 431, if x_origin plus num_null_pixels is greater than clip.right then the system proceeds to block 432, else the system proceeds to block 433. In block 432, the system sets the char_width to clip.right minus x_origin, sets right_count to 1, and proceeds to block 433.

In block 433, the system selects the next virtual character of the selected character, which is the null character. The system pushes onto the visible_stack the phase, width, and offset of the selected virtual character. In block 434, the system decreases char_width by 8. In block 435, if char_width is less than or equal to zero then all the virtual characters for the null character have been processed and the system proceeds to block 436, else the system loops to block 433 to push the next virtual character of the null character.

In block 436, the system decrements right_count. In block 438, if right_count equals 0 then all the visible characters have been processed and their visible virtual character have been pushed onto the visible_stack, and the system return from the justified_text subroutine, else the system loops to block 410 to process the next visible character.

Source code for a representative routine accomplishing this function is filed herewith in Table II.

COMP_BYTE_INTERVAL

This subroutine sets inner_byte_count to the number of non-clipped byte columns that are to be updated. The system sets the LEFT_CLIPPED_MASK and RIGHT_CLIPPED_MASK.

Source code for a representative routine accomplishing this function is filed herewith in Table I.

PROCESS_STACK_DATA

Figure 6:
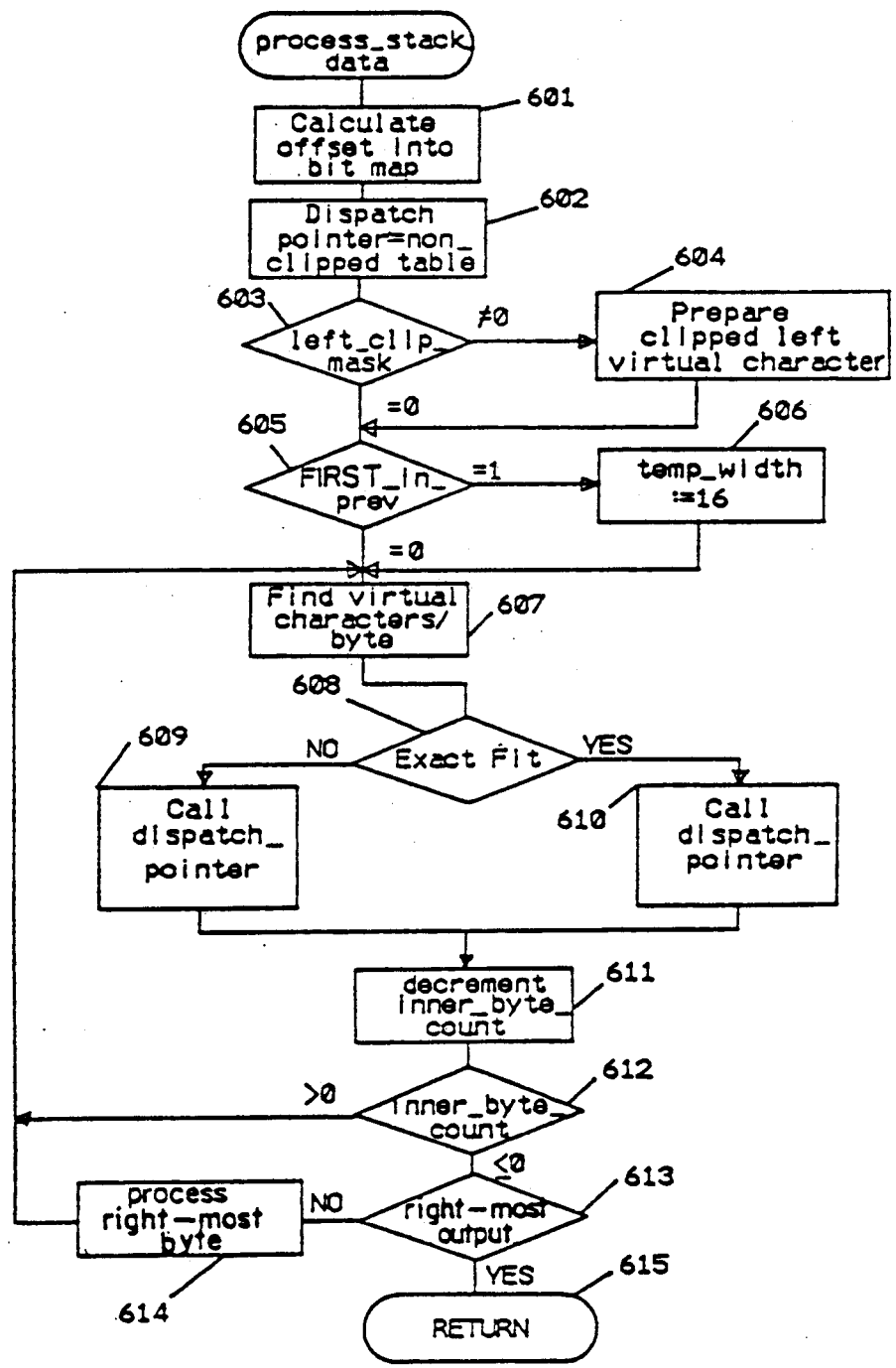
FIG. 6 is a logical flow chart of the process_stack_data subroutine.

In block 601 of FIG. 6, the system calculates the address of the first byte in the bitmap to be written (i.e., (text_bbox.top * bmByteWidth)+scan_start); scan_start is the offset into the scan line of the first byte to be modified. In block 602, the system initializes the dispatch_pointer to the non_clipped_table. In block 603, if clip_left_mask is not equal to zero then visible text does not start on a byte boundary of the bitmap and the system proceeds to block 604, else the system proceeds to block 605.

In block 604, the system increments the inner_byte count to account for this left-most virtual character on the visible stack and the system sets the dispatch_pointer to the clipped_table. The system proceeds to block 605.

In blocks 605 and 606, if the FIRST_IN_PREV flag equals 1 then the first virtual character to be displayed in the left-most byte crosses a display byte boundary and the system sets temp_width to 16, else the system sets temp_width to 8. The system proceed to block 607.

In block 607, the system starts a loop that is executed once for each visible byte column in the bitmap. The system determines the number of virtual characters that are to be display in the current display byte column. In the general case, the number can vary up to eight, that is, each virtual character occupies only one pixel of the current display byte. The system counts the virtual characters in the visible_stack until the next one whose phase plus width is greater than or equal to temp_width is found. The system sets virtual_count to the number of virtual characters to be displayed in the current display byte. In block 608, if the last virtual character fits exactly in the current display byte (i.e., phase+width=temp_width) then the system proceeds to block 610, else the system proceeds to block 609.

In block 610, the system calls the routine whose address is stored in the dispatch table indexed by dispatch_index and virtual_count, sets the temp_width to 8, pops all the virtual characters that have been completely displayed off the visible_stack, and proceeds to block 611.

In block 609, the system calls the routine whose address is stored in the dispatch table indexed by dispatch_index and virtual_count, sets the temp_width to 16, pops all the virtual characters that have been completely displayed off the visible_stack (because the fit was not exact, block 608, one virtual character has only been partially displayed), and proceeds to block 611.

In block 611, the system decrements the inner_byte_count and sets the dispatch_pointer to non_clipped_table. In block 612, if the inner_byte_count is less than or equal to 0 then the system proceeds to block 613 to process the right-most display byte column, else there are still more display byte column to output and the system loops to block 607.

In block 613, if the right-most display byte has been output then the system returns from process_stack_data, else the system proceeds to block 614.

In block 614, the system retrieves the right_clip_mask, sets the dispatch_pointer to the clipped_table, and loops to block 607 to output the right-most display byte.

Source code for a representative routine accomplishing this function is filed herewith in Table II.

DISPATCH_ROUTINE

This subroutine outputs one byte column of data to the bitmap. This subroutine outputs a byte that contains one to eight virtual characters. In the preferred embodiment, the system has one subroutine for outputting a column that has one virtual character per byte; a second subroutine for outputting a column that has two virtual characters per byte; and so on (FIG. 14). The use of these subroutines eliminates the looping that occurs and is thus more efficient than the general routine described below.

Figure 16:
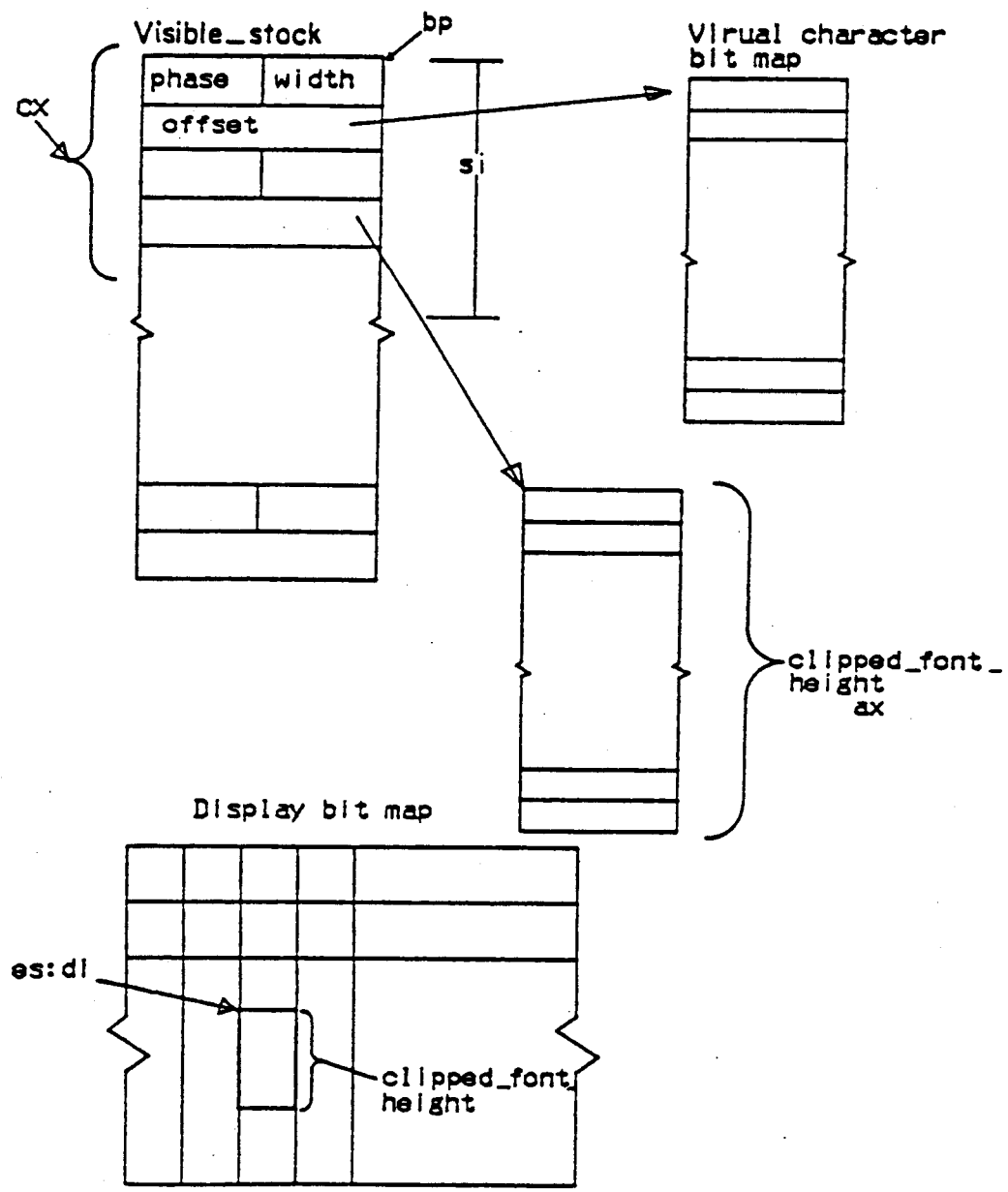
FIG. 16 illustrates the register settings when the dispatch routines are called.

The following is a sample 80386 assembly language listing for outputting one byte column that can have on to eight virtual characters in the column. FIG. 16 illustrates the register assignment prior to invoking this section of code.

| | |
|---|---|
| BP | visible_stack |
| DS | segment that contains character bitmaps |

```
ES:DI   destination display byte
CX      number of characters - 1
AX      font_clipped_height
DX      0
        mov     ss_height,ax
        mov     ss_num_chars,cl
height_loop:
        xor     si,si
        mov     ch,ss_num_chars
        xchg    dx,di
byte_loop:
        mov     bx,[bp][si].cchar    ;retrieve offset
        mov     al,[bx][di]          ;retrieve character
        mov     cl,[bp][si].width    ;retrieve width
        shl     ax,cl
        sub     si,4                 ;next virtual char
        dec     ch
        jnz     byte_loop:
        mov     bx,[bp][si].cchar    ;retrieve offset
        mov     al,[bx][di]          ;retrieve character
        mov     cl,[bp][si].pphase   ;retrieve phase
        shr     ax,cl
        xchg    dx,di
        see FIG. 17 for output instructions
        inc     dx
        dec     ss_height
        jnz     height_loop          ;process next byte
        sub     di,cell_adjust
        ret
```

Source code for a representative routine accomplishing this function is filed herewith in Table III.

In the preferred embodiment, the system employs different routines for handling opaque or transparent modes and white-on-black or black-on-white modes. FIG. 17 illustrates the output instructions that can be used for these modes. In the preferred embodiment, the system has separate routines for outputting clipped and non-clipped byte columns.

In the preferred embodiment, the display bitmap is stored in column major order. However, by modifying the dispatch routine a scan line major ordered bitmap display can be accommodated.

It is apparent to one skilled in the art, that this invention can be used for outputting to multiplanar bitmaps, which are common in color display devices.

It is also apparent to one skilled in the art, that this invention can be used on a variety of computer architectures including those with different units of addressability than eight bits.

Although the present invention has been described in terms of a preferred embodiment, it is not intended that the invention be limited to this embodiment. Modifications within the spirit of the invention will be apparent to those skilled in the art. The scope of the present invention is defined by the claims which follow.

We claim:

1. A method of updating a display bitmap in a column-wise manner to display a string of characters in a selected font with a font height, a bitmap being a matrix of bits defining a display pattern and having an associated width, each character comprising a plurality of virtual characters and having a character width, each virtual character having a virtual character bitmap and a virtual character width, each virtual character bitmap having a height equal to the font height and a width equal to the virtual character width, each character having a character bitmap comprising the virtual character bitmaps for the virtual characters for the character, each virtual character having an associated phase based on the position within a byte in the display bitmap at which the first bit of the virtual character is to be displayed, the display bitmap being logically divided into one-byte wide columns and into scan lines, the method comprising the steps of:

generating a list having an entry for each virtual character that comprises the characters in the string, the entry containing the phase, the width, and a pointer to the virtual character bitmap; and for each column in the display bitmap to be updated with the character string, repeating the steps of:

selecting the column;

combining the virtual character bitmaps for the virtual characters to be displayed in the selected column based on the phase, the width, and the pointer stored in the list for each character; and updating each byte in the selected column to effect the display of a portion of the character string.

2. The method of claim 1 wherein the character string is displayed in opaque mode, wherein a clip rectangle is specified, the clip rectangle indicating the area in the display bitmap outside of which the character string is clipped, and wherein an opaque rectangle is specified, the opaque rectangle indicating the area in the display bitmap to be opaqued, the method comprising the additional steps of:

when generating the list, excluding from the list the entries for virtual characters completely outside the clip rectangle;

when updating the bytes in each column, updating only those bits within the clip rectangle;

determining a text bounding box for the virtual characters in the list, the text bounding box being a rectangle delimiting the area of the display bitmap to be updated with the virtual characters; and updating the display bitmap outside the text bounding box to effect the opaquing of the opaque rectangle.

3. The method of claim 1 wherein an intercharacter spacing is specified for a plurality of adjacent characters in the string, the method comprising the additional step of:

for each pair of adjacent characters in the character string for which an intercharacter spacing is specified, adding one null virtual character to the list to effect the intercharacter spacing, the null virtual character having a virtual character bitmap indicating a blank display pattern.

4. The method of claim 1 wherein an intercharacter spacing is specified for a pair of adjacent characters in the string, the method comprising the additional step of:

if the virtual character width of the rightmost virtual character of the left character of the pair of adjacent characters is not a multiple of the number of bits per byte, increasing the virtual character width contained in the list for the rightmost virtual character to effect the intercharacter spacing.

5. A method of updating a display bitmap in a column-wise manner to display a string of characters in a selected font, a bitmap being a matrix of bits defining a display pattern and having an associated width and height, each character comprising a plurality of virtual characters and having a character width and character height, each virtual character having a virtual character bitmap and a virtual character width, each virtual character bitmap having a height equal to the character height and a width equal to the virtual character width, each character having a character bitmap comprising the virtual character bitmaps for the virtual characters for the character, each virtual character having an associated phase based on the position within a byte in the display bitmap at which the first bit of the virtual character is to be displayed, the display bitmap being logically divided into one-byte wide columns and into scan lines, the method comprising the steps of:

(A) for each virtual character composing the characters in the string, repeating the steps of:
(1) determining the phase of the virtual character;
(2) determining the width of the virtual character;
(3) generating a pointer to the virtual character bitmap; and
(4) storing the phase of the virtual character, the width of the virtual character, and the pointer to the virtual character bitmap as an entry in a list so that the list is logically in the same order as the characters in the string;

(B) for each column in the display bitmap to be updated with the character string, repeating the steps of:
(1) determining the number of virtual characters to be displayed in the column based on the entries stored at the beginning of the list;
(2) for each scan line to be updated in the column to be updated, the number of scan lines being equal to the character height, repeating the steps of:
(a) for each virtual character to be displayed in the column, the number of virtual characters being determined in step (B) (1), retrieving the byte from the virtual character bitmap that corresponds to the scan line to be updated, the byte being retrieved based on the pointer in the entry for the virtual character in the list;
(b) combining the retrieved bytes based on the phase and the width of the virtual characters to be displayed in the column; and
(c) updating the column at the scan line with the combined byte to effect an update of the display bitmap; and
(3) removing from the beginning of the list the entries for the virtual characters fully displayed in the display bitmap after all scan lines in the column are updated.

6. The method of claim 5 wherein step (B) (2) is performed by a plurality of computer routines, each routine capable of performing the sub-steps (a), (b), and (c) of (B) (2) for a fixed number of virtual characters per column.

7. The method of claim 5 wherein step (A) additionally includes the step of adding an entry containing the phase, the width, and pointer to a null virtual character onto the list to effect intercharacter spacing, the null virtual character having a virtual character bitmap indicating a blank display pattern.

8. The method of claim 5 wherein step (A) additionally includes the step of adding an entry containing the phase of a null virtual character, the width of a null virtual character, and the pointer to a null virtual character bit map as the first entry in the list to effect byte alignment between the display bitmap and the characters in the list.

9. The method of claim 8 wherein the step of adding an entry for a null virtual character at the beginning of the list includes the step of creating a left clip mask so that the null virtual character is clipped when the display bitmap is updated.

10. The method of claim 5 wherein step (A) additionally includes the step of adding an entry containing the phase of a null virtual character, the width of a null virtual character, and a pointer to a null virtual character bitmap as the last entry in the list to effect byte alignment between the display bitmap and the characters in the list.

11. The method of claim 10 wherein the step of adding a null virtual character additionally includes the step of creating a right clip mask so that the null virtual character is clipped when the display bitmap is updated.

12. The method of claim 5 wherein the step (B) (2) (b) includes determining whether the display bitmap is to be updated in opaque mode and white-on-black mode and adjusting the combined byte before updating the display bitmap to reflect the determination of these modes.

13. The method of claim 5 wherein the retrieved bytes are combined using a plurality of routines, each routine being optimized for a preselected number of virtual characters per column.

14. The method of claim 5 wherein the character bitmaps are stored in a computer memory, the computer memory comprising bytes, the computer memory being byte addressable, each byte comprising a specified number of bits, the character bitmap being a matrix of bits of a specified number of rows and specified number of columns, the rows being logically numbered sequentially from zero to the specified number of rows minus one, the columns being logically numbered sequentially from zero to the specified number of columns minus one, the method of storing the character bitmaps comprising the steps of:

(a) selecting a memory location at which to store the character bitmap;
(b) selecting column number zero;
(c) for each row in the selected column,
selecting the bit in the selected row at the selected column and selecting the bits in the selected row at the adjacent columns, the adjacent columns being those columns whose column number is greater than the column number of the selected column but less than column number of the selected column plus the number of bits in a byte and less than the number of columns in the character bitmap;
storing the selected bits in the selected memory location; and
selecting the next sequential memory location;
(d) selecting a column whose column number is equal to the currently selected column number plus the number of bits in a byte; and
(e) repeating steps (c) and (d) until the selected column number is greater than or equal to the number of columns in the character bitmap.

15. A method of storing a character bitmap in column-wise manner in a computer memory, the computer memory comprising bytes, the computer memory being byte addressable, each byte comprising a specified number of bits, the character bitmap being a matrix of bits of a specified number of rows and specified number of columns, the rows being logically numbered sequentially from zero to the specified number of rows minus one, the columns being logically numbered sequentially from zero to the specified number of columns minus one, comprising the steps of:

(a) selecting a memory location at which to store the character bitmap;
(b) selecting column number zero;
(c) for each row in the selected column, selecting the bit in the selected row at the selected column and selecting the bits in the selected row at the adjacent columns, the adjacent columns being those columns whose column number is greater than the column number of the selected column but less than column number of the selected column plus the number of bits in a byte and less than the number of columns in the character bitmap;

storing the selected bits in the selected memory location; and selecting the next sequential memory location;

(d) selecting a column whose column number is equal to the currently selected column number plus the number of bits in a byte; and (e) repeating steps (c) and (d) until the selected column number is greater than or equal to the number of columns in the character bitmap.

* * * * *